United States Patent
Gronlund

(10) Patent No.: US 9,356,847 B2
(45) Date of Patent: May 31, 2016

(54) METHOD FOR MONITORING AND DISPLAYING HIGH SPEED BUS PERFORMANCE

(71) Applicant: Keysight Technologies, Inc., Minneapolis, MN (US)

(72) Inventor: Robert D Gronlund, Loveland, CO (US)

(73) Assignee: Keysight Technologies, Inc., Santa Rosa, CA (US)

( * ) Notice: Subject to any disclaimer, the term of this patent is extended or adjusted under 35 U.S.C. 154(b) by 516 days.

(21) Appl. No.: 13/665,799

(22) Filed: Oct. 31, 2012

(65) Prior Publication Data

US 2014/0122696 A1    May 1, 2014

(51) Int. Cl.
| | | |
|---|---|---|
| G06F 15/16 | (2006.01) | |
| H04L 12/26 | (2006.01) | |
| G06F 11/34 | (2006.01) | |
| G06F 11/32 | (2006.01) | |

(52) U.S. Cl.
CPC ............ *H04L 43/045* (2013.01); *G06F 11/323* (2013.01); *G06F 11/349* (2013.01); *H04L 43/062* (2013.01); *H04L 43/106* (2013.01); *G06F 2201/835* (2013.01); *H04L 43/0894* (2013.01)

(58) Field of Classification Search
CPC ..... H04L 67/00; H04L 43/045; H04L 43/062; H04L 43/106; H04L 43/0894; G06F 2201/835; G06F 2201/84; G06F 11/323; G06F 11/349

USPC .......................................... 715/736; 709/224
See application file for complete search history.

(56) References Cited

U.S. PATENT DOCUMENTS

| | | | |
|---|---|---|---|
| 6,219,050 B1* | 4/2001 | Schaffer ........................ 715/853 |
| 6,614,763 B1* | 9/2003 | Kikuchi et al. ................ 370/252 |
| 6,654,803 B1* | 11/2003 | Rochford et al. ............. 709/224 |
| 2007/0036082 A1* | 2/2007 | Sonksen et al. ............... 370/242 |
| 2008/0052394 A1* | 2/2008 | Bugenhagen et al. ........ 709/224 |
| 2008/0069046 A1* | 3/2008 | Ishii et al. ..................... 370/330 |
| 2008/0144618 A1* | 6/2008 | Frishberg ...................... 370/389 |
| 2009/0217187 A1* | 8/2009 | Kendall et al. ................ 715/765 |
| 2009/0232016 A1* | 9/2009 | Pruthi et al. .................. 370/252 |

* cited by examiner

*Primary Examiner* — Christopher Biagini
*Assistant Examiner* — Tan Doan

(57) ABSTRACT

A method for operating a data processing system to display data related to a plurality of packets that traverse a communication link is disclosed. A copy of the packets that traverse the link is provided including a timestamp corresponding to each packet that defines a time at which the packet traversed the link. A display is generated having first and second regions. The first region includes an X-Y chart in which each packet is represented by a multi-value glyph denoting a first property related to that packet, the first property having more than two values. The second region includes a first annotation glyph for one of the packets, the first annotation glyph being located at the X-location corresponding to the timestamp for the packet. The first annotation glyph is present if that data packet has a second property.

18 Claims, 8 Drawing Sheets

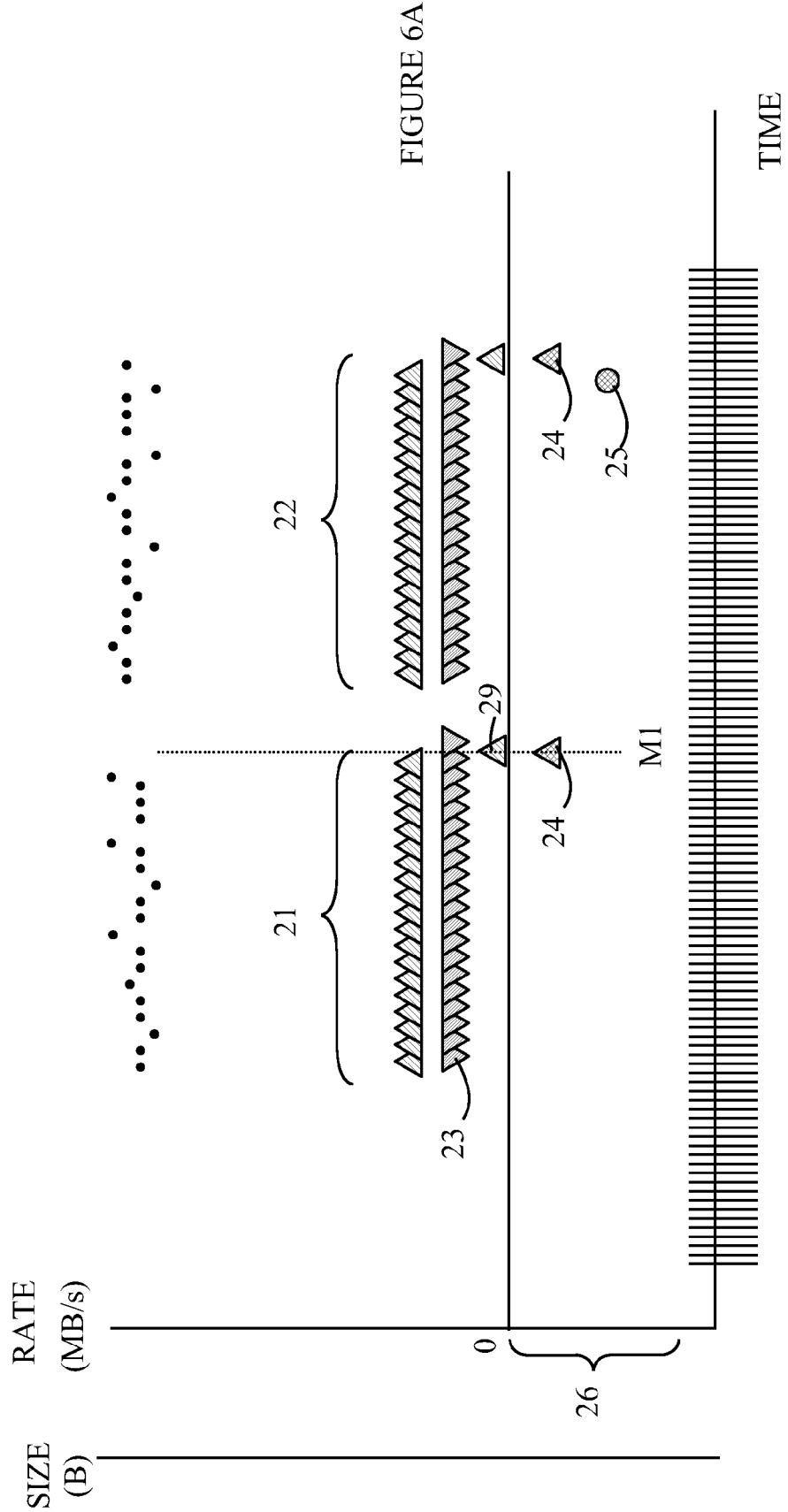

FIGURE 6B

| ANNOTATIONS | TIMESTAMP | HEADER | PAYLOAD | COMPUTED DATA |
|---|---|---|---|---|
| | 1.490453532 s | | | |
| | 1.490453564 s | WRITE UP… | 0000 … | 30.11 MB/SEC |
| | 1.490453596 s | ACK … | | |
| M1 △ | 1.490453628 s | INTxAsrtMBs-U … | | |
| … | … | … | … | … |
| ⊚ | 1.708181447 s | WRITE UP… | 0000 … | 30.01 MB/SEC |
| | | | | |
| | | | | |
| | | | | |

METHOD FOR MONITORING AND DISPLAYING HIGH SPEED BUS PERFORMANCE

PCI Express (PCIe) buses are used in many computers for transmitting data between the processor chips and peripherals such as graphic display processors and other devices requiring high speed and high bandwidth data transfers. Modern instrumentation is increasingly migrating from special purpose standalone instruments such as oscilloscopes to computer based, modular instruments in which specialized data acquisition and processing components are added to conventional computers to arrive at more flexible instruments. The PCIe bus architecture often plays an important role in such hybrid instruments.

For example, an instrument for monitoring RF transmissions in cellular communication environments must deal with signal channels having bandwidths of hundreds of MHz. Instruments for monitoring these transmissions can be constructed from a specialized analog to digital conversion module that can digitize the RF transmissions at the required data rates and a multi-core computer processor for processing the data. The PCIe bus is used to move the data from the data acquisition card to the computer's memory. The multi-core processors with the aid of other parallel processors typically located in FPGAs, ASICs, DSPs and possibly graphical processing cards then perform the relevant computations and display the signal parameters that constitute the measurement output of the instrument.

Such applications drive the PCIe bus at or near its maximum operating throughput in moving the data between the various components at the speeds needed to provide real time signal analysis. Hence, diagnostic hardware and software that allows a system designer to view the performance of the PCIe bus during real time operation of an instrument plays an important role in designing and testing such high speed instrumentation. In addition, interactions between the data transfer portion of the instrument and the processing portion can result in contention for the limited bus resources, which, in turn, can degrade the bus performance in addition to other factors such as improper link implementation.

Hardware that captures the entire contents of the transmissions on a PCIe bus is commercially available. However, software that presents the data in a manner that allows the user to fully grasp the PCIe bus performance as well as proper and improper operation presents significant challenges. Transmissions on a PCIe bus are in the form of layered communication packets in which each packet typically has a header that defines the contents of the packet and a payload. The packets are communicated between two end points on the bus, e.g., a data acquisition card and the memory of the computer. In addition, since PCIe is implemented by bi-directional links, the packets travel in both directions. There are a number of different types of packets that are exchanged between the end points of a transmission utilizing the PCIe bus (possibly by traversing multiple tree-structured links via PCIe switches and bridges). Keeping track of the performance of the bus for various types of exchanges and types of packets presents challenges that have not been totally met by existing diagnostic software.

In one prior art solution of the data presentation problem, each packet is captured and displayed as a record in a tabular listing, having one line for each packet. The header information and the payload contents for each packet, along with a timestamp indicating when the packet was sent are displayed. While this display captures all of the traffic information, the relationship between the performance of the PCIe bus and the detailed traffic is difficult to understand from such a tabular listing. Here, the performance of the PCIe bus is defined to be the rate of data transfer on the bus for a data payload bearing packet.

Programs that measure and display the performance of the bus as a function of time are also available. However, such programs do not provide insight into the causes of aberrations in the performance without referencing a tabular display and finding the corresponding time periods in that display. Even then, the user must interpret the individual packets to arrive at an understanding of the transactions that are causing the aberrations in question.

Software tools that display the flow control between the end points of data transfer transactions are also known to the art. However, such tools do not provide an understanding of overall system operation or provide performance visualization aids.

Accordingly, an improved software tool that allows the user to visualize the instantaneous performance of the PCIe bus as well as the transactions that are taking place at any time is needed.

SUMMARY

The present invention includes a method for operating a data processing system to display data related to a plurality of data packets that traversed a communication link and computer readable media storing instructions that cause a data processing system to execute that method. The packets include packets of different types. The method includes providing a copy of the packets that traverse the data link and generating a display representing those packets. The copy of the data packets includes a timestamp for each data packet, the timestamp defining a time at which the data packet traversed the communication link. The display includes a first region having an X-Y chart in which each packet is represented by a multi-value glyph denoting a first property related to that packet, the first property having more than two values. The multi-value glyph is located at an X-axis time value corresponding to the timestamp for that packet and a Y-location corresponding to the first property of the data packet. The display further includes a second region which includes a first annotation glyph for one of the data packets, the first annotation glyph being located at the X-location corresponding to the timestamp for the one of the data packets. The first annotation glyph is present if that data packet has a second property.

In one aspect of the invention, the Y-axis value of the first annotation glyph is determined by the second property. Different types of annotation glyphs are located at different Y-axis values in said second region when there are multiple annotation glyphs defined.

In another aspect of the invention, the first property is determined by a packet transmission rate for each data packet of a first data packet type. The transmission rate can be an instantaneous transmission rate or an average transmission rate computed for a plurality of data packets.

In another aspect of the invention, packets are packets from a PCIe bus.

In yet another aspect of the invention, a text annotation corresponding to one of the data packets is displayed at a location determined by the timestamp for that one of the data packets. The text annotation can include textual information that is part of the data packet.

In a still further aspect of the invention, the X-axis time scale is altered in response to input from a user of the data processing system, and the text annotation is characterized by text annotation property that changes when the X-axis time scale is altered. The text annotations can be selectively omitted to prevent the text annotations from obscuring one another. The text annotations that are omitted depend on the packet type of the packet associated with the text annotations.

BRIEF DESCRIPTION OF THE DRAWINGS

FIGS. 6A and 6B illustrate the relationship between a time display and a tabular display according to one embodiment of the present invention.

DETAILED DESCRIPTION OF PREFERRED EMBODIMENTS

Figure 1:
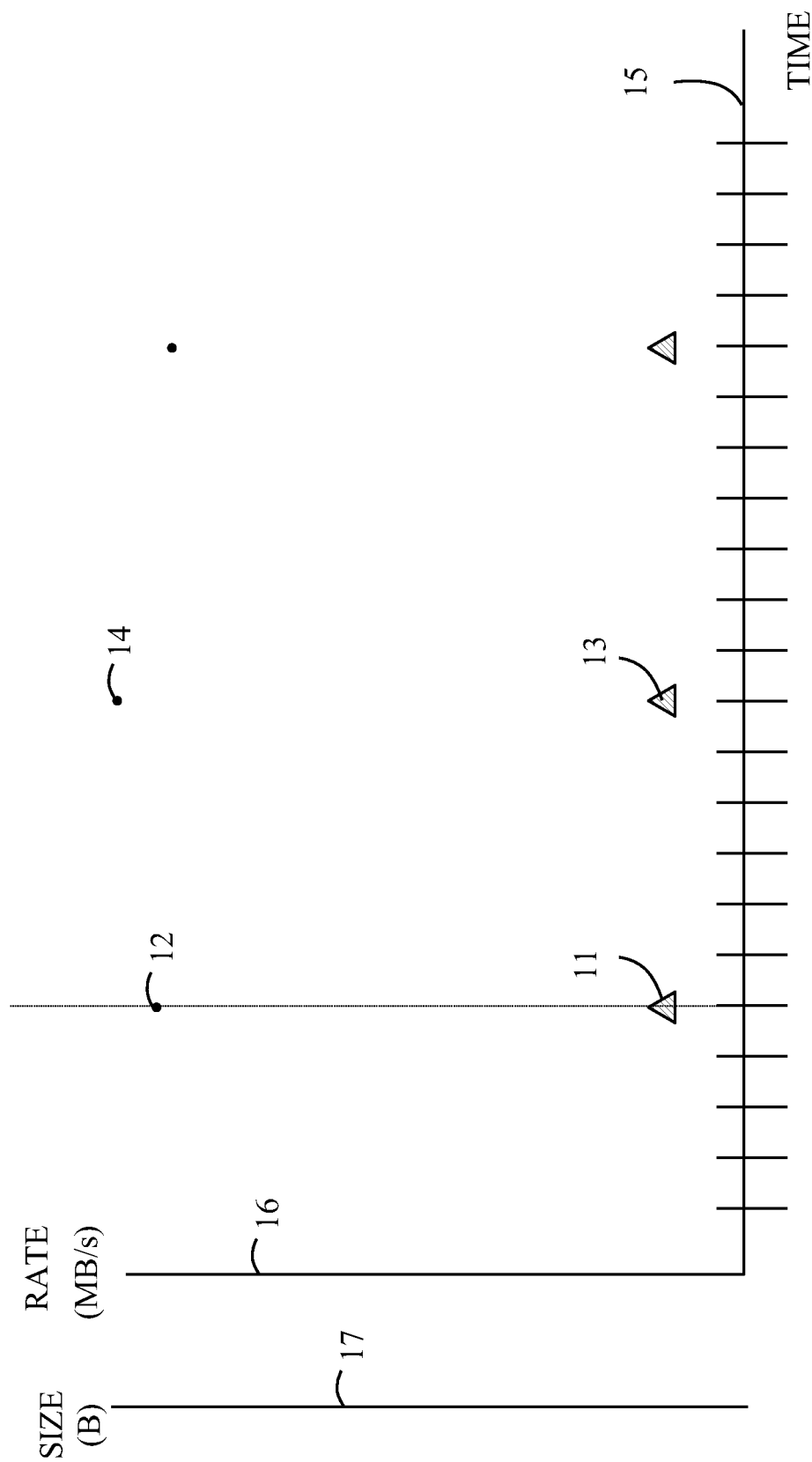
FIG. 1 is an example of the first area of a plot according to the present invention in which just the packet size and data transmission rate are plotted for each packet.

The present invention can be more easily understood with reference to a PCIe bus; however, as will be explained in more detail below, the present invention can be used to analyze the performance and/or traffic on any high speed data link on which data is exchanged using a layered packet protocol.

The present invention can provide a single analysis tool that annotates and charts PCIe bus performance for PCIe bus traffic that is monitored by a bus analyzer that observes each data packet of the PCIe bus and assigns a timestamp to that packet. In general, there are a plurality of different data packet types and sizes being transmitted on the PCIe bus. Data packets are transmitted to and from end points on the bus. For the purposes of this discussion, data packets that traverse the PCIe bus in one direction will be referred to as upstream data packets, and those that traverse the PCIe bus in the opposite direction will be referred to as downstream data packets. Each data packet includes a header and, optionally, a payload. A data packet is characterized by two sizes. The first is the total number of bytes in the data packet, and the second is the number of bytes in the payload.

The transmission of each data packet is also characterized by a transmission rate. For many purposes, the transmission rate of most interest is the number of bytes per unit of time of payload data, i.e., data in the payload portion of the packet as opposed to the header portion of the packet.

For the purposes of this discussion, it will be assumed that the bus analyzer assigns the timestamp to the same point in each packet, typically, either the start of the packet or the end of the packet. The instantaneous transmission rate of a packet is defined to be the number of bytes of payload transferred in the time interval between the time indicated by the timestamp of the packet in question and the time indicated by the timestamp of an adjacent data payload bearing packet, often the previously transmitted packet on the bus in that link direction that carried a payload.

In one aspect of the invention, a plot is generated that provides information about each packet that was observed on the bus. As noted above, each packet has a header that provides information about the packet type and the (possibly implicit e.g. link partner) address on the bus to which the packet is being sent. For example, the packet header and/or payload could indicate that the packet is an interrupt and specify the interrupt vector to which the interrupt is directed. In another example, the packet header could indicate that the packet is a request to read data from the recipient (completer) of the packet. The recipient will then answer with one or more completion packets having the requested data. Data from the header can be viewed as either having a binary value that indicates a packet type or a multi-valued value. For example, packets could be characterized as upstream write packets, downstream write packets, upstream read requests, downstream read requests, completions, interrupts, etc. A packet is either one of the specified types or it is not. In one aspect of the present invention, each of the possible packet types is represented by glyph corresponding to that packet type and a timestamp value indicating the time at which the packet was sent on the bus.

A packet can also be characterized by a multi-valued quantity. For example, the instantaneous transmission rate of the packet on the bus is such a value. The address to which the packet is being sent is another example of such a multi-valued quantity. The size of the payload in a data packet is yet another example of a multi-valued quantity associated with the packet. A multi-valued quantity can be part of the header or payload, or be a quantity that is calculated from data in the header and/or payload.

In one aspect of the invention, the plot has two areas. The first area displays multi-valued quantities associated with each packet, and the second area displays glyphs that characterize particular packets. The first area can be viewed as an X-Y plot in which the X-axis is the time associated with the packet from the timestamp for that packet and Y-axis displays the value of the multi-valued quantity for that packet if such a value has been defined for the specific packet type. If more than one multi-valued quantity can be displayed for the packets, the plot can be viewed as a multi-Y-axis plot having a different scale for each of the plotted quantities or alternately viewed as multiple single Y scaled X-Y plots aligned on the X axis timestamp values or any combination thereof.

The second area of the graph displays glyphs indicating one or more binary valued quantities associated with each packet. This area of the plot will be referred to as the annotation area. The annotation area includes one or more "bands". Each band is used to display a glyph associated with one type of binary-valued data. For example, all upstream flow control packets could be assigned a first glyph that is displayed in a first band in the annotation area under the time value corresponding to that packet. If a packet is of a different type, the area in this band would be blank. Similarly, all downstream flow control packets could be assigned a second glyph that is displayed in a separate band under the packets of this type.

Refer now to FIG. 1, which is an example of the first area of a plot according to the present invention in which just the packet size and data transmission rate are plotted for each packet. The plot is an X-Y plot in which the X-axis shown at 15 is the time associated with the transmission of the packet as determined from the timestamp associated with a packet. There are two Y-axes shown at 16 and 17. Axis 16 shows the transmission rate for the packets, each packet being plotted as a glyph consisting of a dot at the corresponding height on axis 16. Data rate glyphs for exemplary packets are labeled at 12 and 14. Axis 17 shows the size of the packet for each of the packets. The packet size is plotted using a different glyph. In the example shown in FIG. 1, up pointing triangles such as glyphs 11 and 13 are used to plot the packet data size of write packets to upstream which is read from axis 17. It should be noted that the time axis scale is chosen in this example so that the glyphs for each of the packets can be seen without overlap with the glyphs for adjacent packets.

In one aspect of the invention, the glyphs for one of the quantities plotted for each packet have a lateral dimension such that the glyphs merge for that quantity when the view of the plot is zoomed out to compress the time scale. This feature allows certain burst transfers to be more easily identified in the plot.

Figure 2:
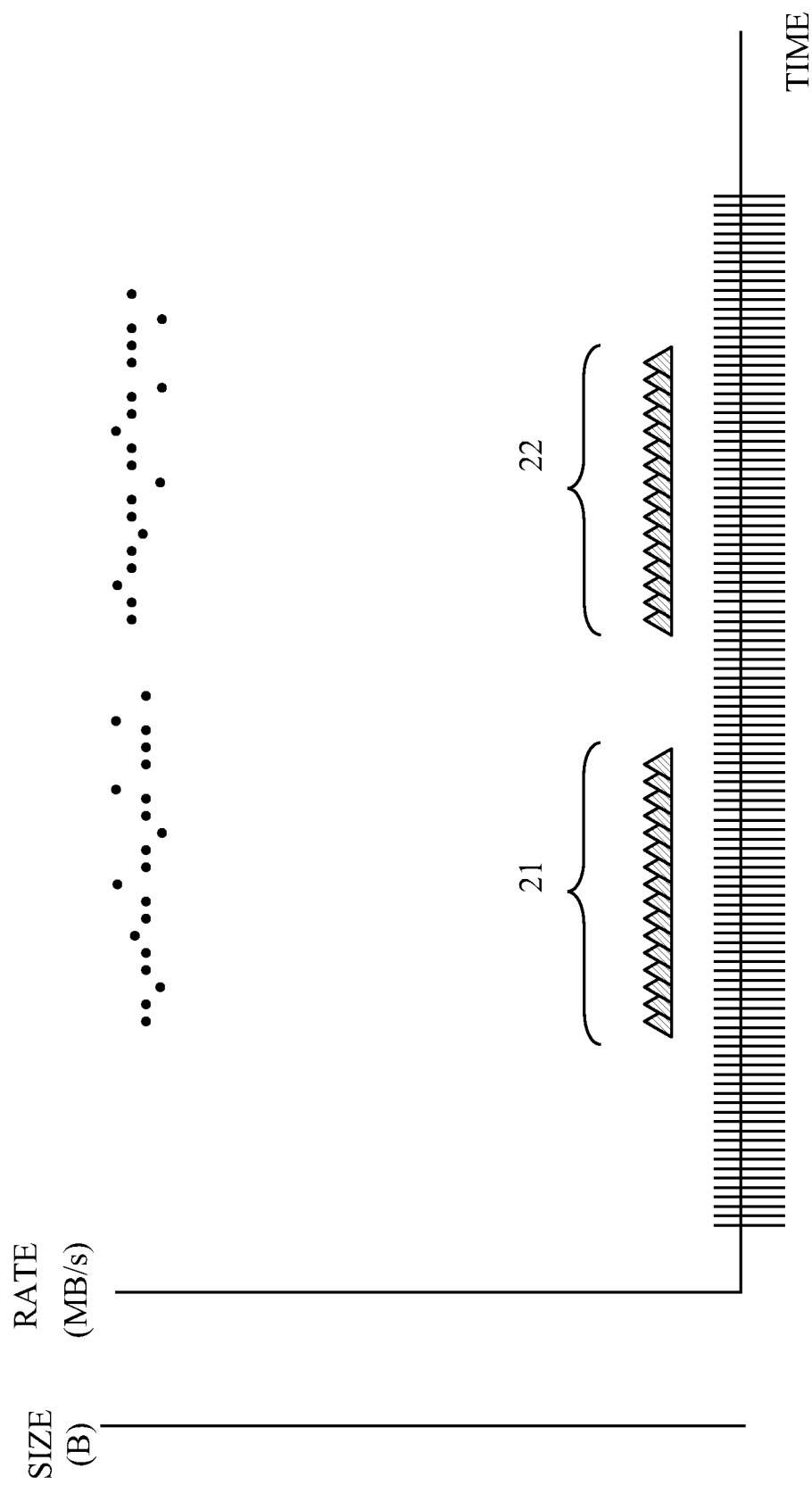
FIG. 2 illustrates a plot according to one embodiment of the present invention of a sequence of two pages transferred by a DMA engine using PCIe write packets over a PCIe bus.

Refer now to FIG. 2, which illustrates a plot according to one embodiment of the present invention of a sequence of two pages transferred by DMA over a PCIe bus. Each transfer involves sending the contents of a buffer on the sending device over the PCIe bus as a sequence of 256B packets. The time scale of the plot is chosen such that the glyphs for the packet size overlap as shown at 21 and 22. Each group of overlapping glyphs corresponds to one DMA page transfer. The time interval between the groups of transfers corresponds to control packets being sent to set up the second DMA page transfer shown at 22. It should be noted that the individual glyphs for the data rate are still visible in the figure, so that any significant variation in bus performance over each of the transfers can be detected.

Figure 3:
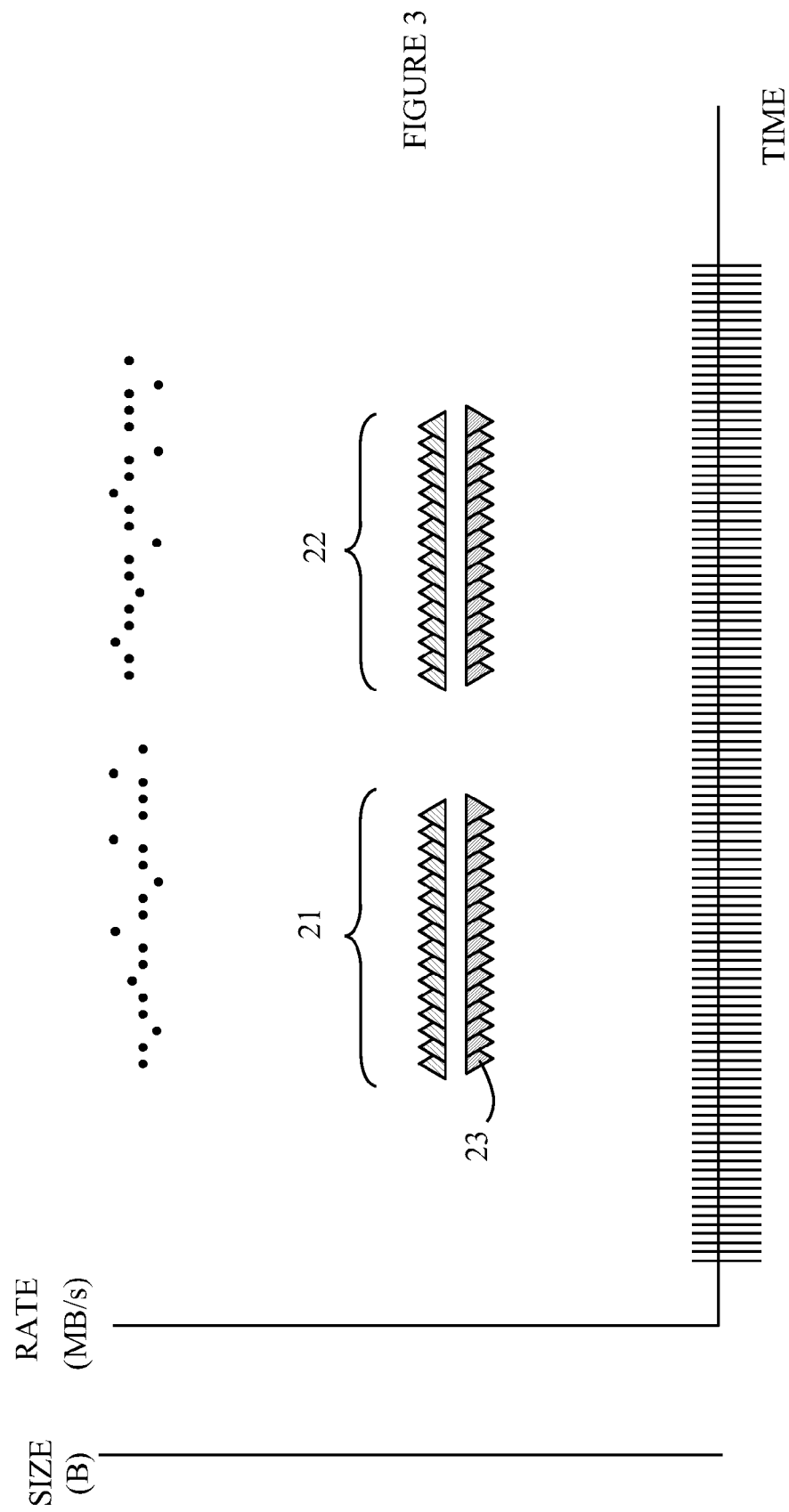
FIG. 3 illustrates a plot of a transmission session in which packet property glyphs are provided for the acknowledgment packets.

In one aspect of the invention, different multi-valued packet property markers are displayed at different Y-axis values so as to allow the different types of packet property markers to be more easily viewed. Consider the case of the DMA page transfer shown in FIG. 2. In this example, each time a data bearing packet is transmitted in the upstream direction, the receiving device sends back an acknowledgement packet indicating that the packet was received. Refer now to FIG. 3, which illustrates a plot of a transmission session in which packet property markers are also provided for the acknowledgment packets, which are packets sent in the downstream direction (which may or may not correspond 1-1 to data packets in the opposite stream). In FIG. 3, the plot of FIG. 2 has been augmented with downstream packet property markers as shown at 23. The Y-location of these downstream packet property markers is set to be different than that of the upstream packet property markers so that the two sets of packets can be more easily viewed. It should also be noted that using different glyphs for different multi-valued packet values also improves the readability of the plot.

Figure 4:
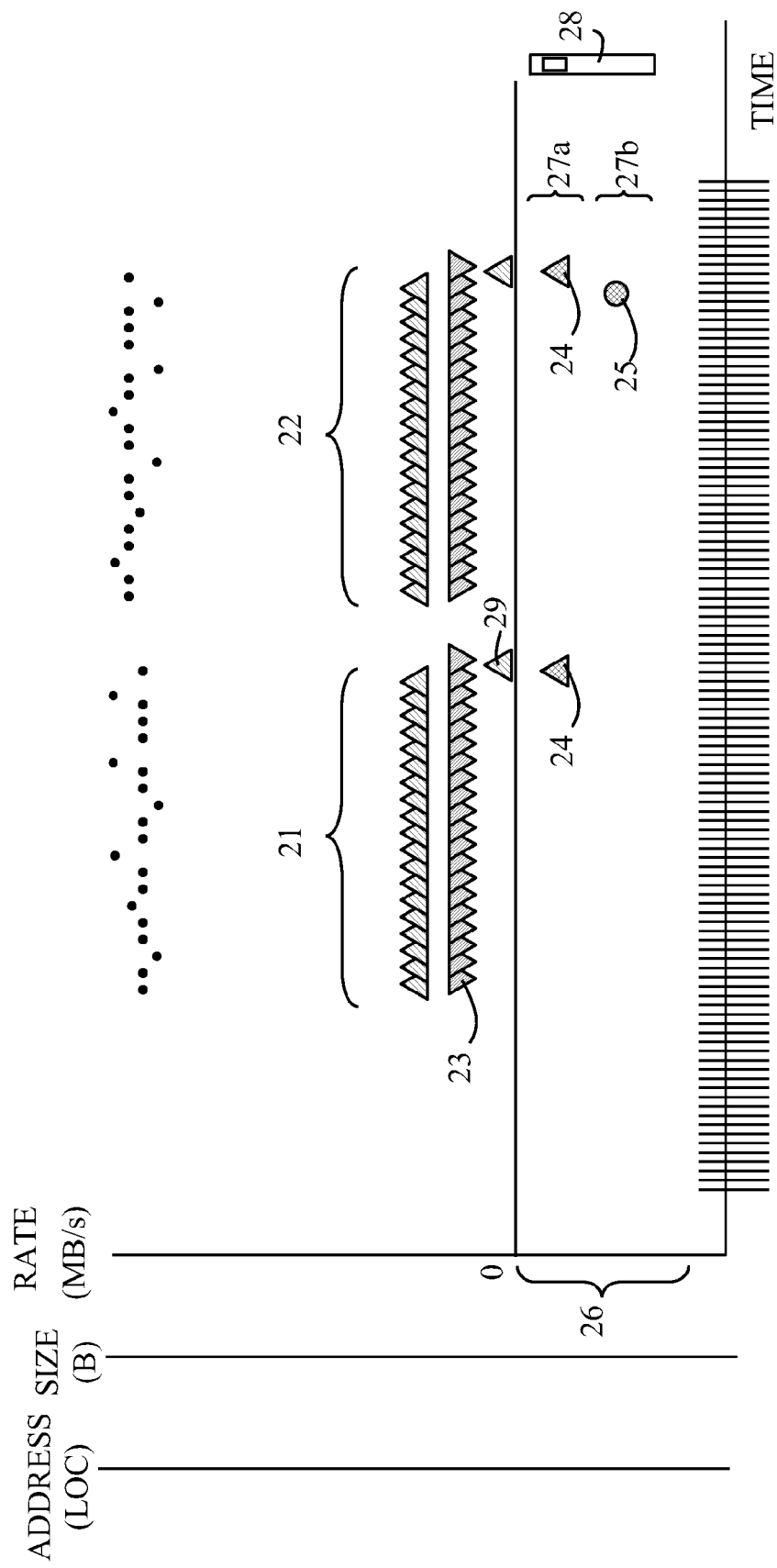
FIG. 4 illustrates a display according to one embodiment of the present invention that includes annotation glyphs.

As noted above, the display of the present invention can also include an annotation area in which glyphs corresponding to packets with particular properties are displayed. The annotation area is divided into a number of horizontal bands. Each band is used to display a glyph corresponding to particular type of packet. Different bands display the glyphs for different types of packets. Refer now to FIG. 4, which illustrates a display according to one embodiment of the present invention that includes annotation glyphs. The display in FIG. 4 is substantially the same as that shown in FIG. 3 with a region below the X-axis for displaying the annotation glyphs. Annotation region 26 is divided into a plurality of bands. Typical bands are shown at 27a and 27b. Each band is dedicated to a particular binary (or low value N-ary) valued packet property. If a packet has that property, a glyph is shown in the corresponding band at an X-value corresponding to the timestamp of that packet. In the example shown in FIG. 4, the glyphs at 24 mark packets that are interrupt packets. In this example, interrupt packets are a special type of write upstream packet in which the interrupt is indicated by the address to which the packet is directed. Hence, the packet shown at 29 has a glyph indicating the packet size (or in an alternate representation, the vector or associated device address) and a glyph 24 indicating that the packet is an interrupt. In the example shown in FIG. 4, band 28 is used to display glyphs corresponding to packets that did not successfully complete transmission. Such a packet is shown by a different glyph at 25. Here again, using different glyphs for different properties makes the display more readable.

In one aspect of the present invention, the annotation glyph bands are ordered vertically using a predetermined packet property hierarchy. When a PCIe bus is powered up, the link(s) is first trained to link bi-directionally, etc. This activity is reflected in a first group of packets. Next, flow control credits are initialized. This activity is reflected in a second group of packets on the bus. Then, the bus is enumerated using configuration packets (which may also be shown in the X-Y area e.g. as bus and device addresses), which is reflected in a third group of packets on the bus. The annotations corresponding to packet types with each of the groups are likewise organized into bands and groups of bands that reflect this hierarchy. This facilitates the use of the display to analyze the bus operation starting with the initial provisioning of the bus (if such activity has been captured by the analyzer buffer). As the low level functions are completed, these bands are no longer necessary, and hence, can be removed without changing the display as determined by the user of the tool. In one aspect of the present invention, the annotation region is scrollable as shown at 28, so that particular groups of bands can be viewed or hidden. By grouping the bands in a hierarchical manner, the scrolling can be used to focus the analysis on the particular functions of interest.

Figure 5:
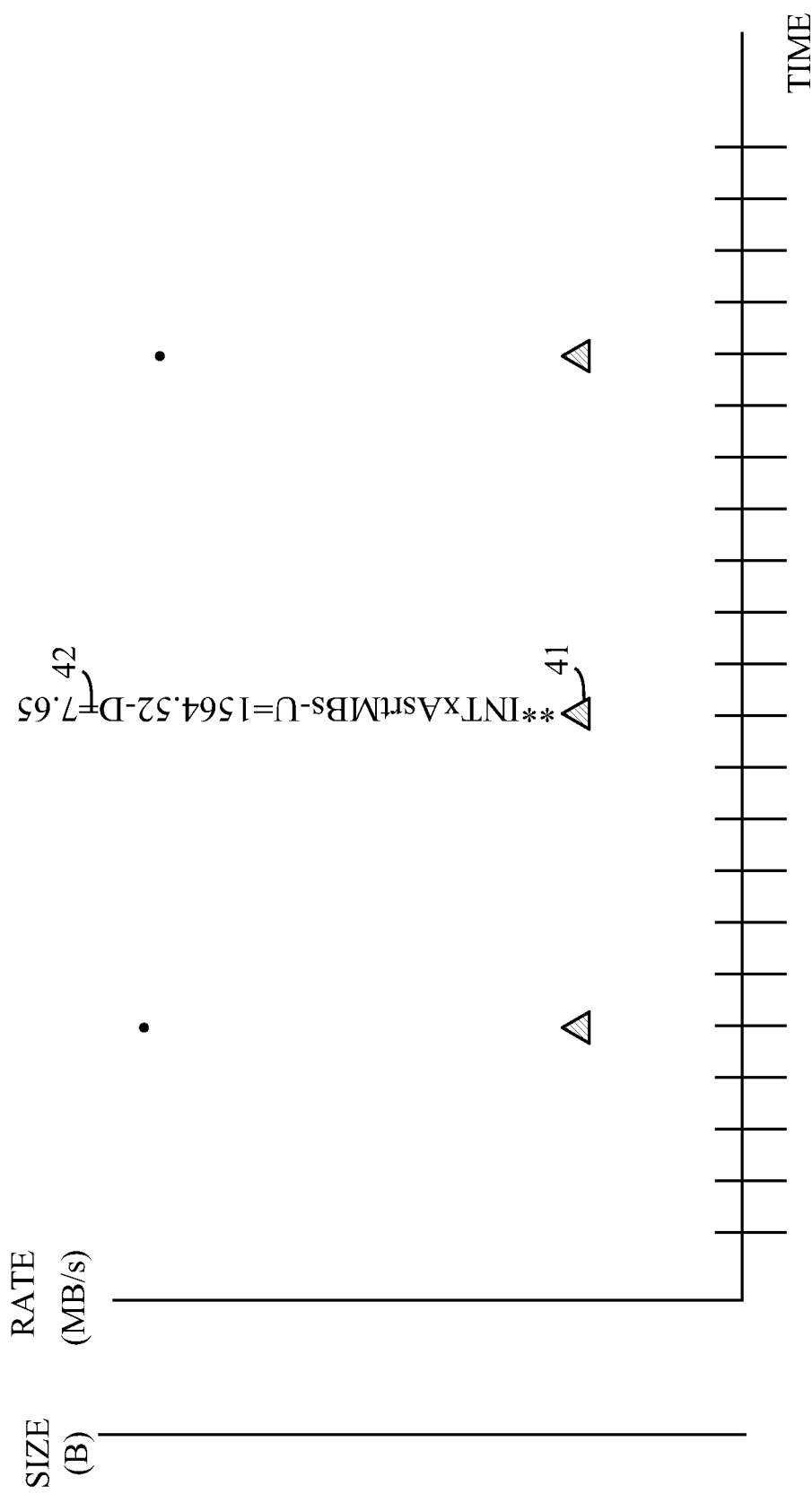
FIG. 5 is a zoom-in view of a display according to one embodiment of the present invention.

In another aspect of the present invention, text annotations associated with specific packets are displayed starting with the text at a location associated with that packet. Refer now to FIG. 5, which is a zoom-in view of a display according to one embodiment of the present invention in which glyph 41 indicating an upstream message consisting of an interrupt has a text annotation 42 that provides the contents of the upstream packet and/or calculated information such as average data rate since the last interrupt. The displayed contents can be limited to all or a portion of the header of the packet or to the entire packet at the option of the user.

Providing text annotations for all of the packets at zoom values at which the individual glyphs already overlap presents challenges. In general, the text annotations shown in any view are determined by the user. In one aspect of the invention, the user points to the glyph corresponding to a particular packet, and the text annotation corresponding to that packet is then displayed. The user can then leave that text annotation displayed and display the text annotation corresponding to a different glyph or turn off the text annotation in question.

In another aspect of the invention, when the text annotations that have been turned on by the user become so numerous that the various text annotations obscure one another, the text annotations are decimated so that the text annotations do not obscure one another in the view. The text annotations that are suppressed can be determined by the user. For example, the user can select every $n^{th}$ text annotation for display or only text annotations corresponding to a particular type of packet such as an interrupt. The rule for decimating the text annotation display can also be customized with respect to the type of packet. For example, for upstream packets that are part of a large DMA transfer, every $n^{th}$ packet could be displayed with the others suppressed, or alternately, for example, the addresses of page starts could only be displayed, while the text annotation for each interrupt is displayed.

In addition, the text size, opacity, and color used for the text annotations corresponding to different types of packets can be varied to improve the clarity of the display. The combination of text size, opacity, and color will be referred to as text properties in the following discussion. The text properties can be altered when a particular packet is selected by a user. For example, an annotation that is normally displayed in a semi-transparent font of gray could be changed to an opaque font of a larger font size in red when the user selects the packet.

The glyphs used to denote the packet properties can likewise have display properties that vary both in terms of the type of packet and in terms of specific sub-classes of packets. For example, the user could select a specific type of packet and have the glyph for that packet displayed in a more visible form, e.g., different color, larger size, more opaque, etc. The glyph properties can also vary depending on the level of zoom in the display. For example, as the user zooms in, the glyphs for a particular type of packet could change in size to be more visible or display different properties that depend on the details of the corresponding or adjacent packets. The changes in glyph display properties can be performed automatically in response to the X-axis zoom level or in response to specific commands from the user. In addition, particular glyphs can be selected or deselected for display either automatically or in response to a user command.

Glyphs and annotations can also be used to display packet properties that are computed from other data in the current packet or a collection of packets related to the packet at which glyph or text is displayed. For example, a user could write a macro that computes the average transmission rate over a number of packets for packets of a particular type, or wish to mark packets that have some property that is computed from the data in the packets. In addition, glyphs can be manually inserted to mark specific packets for cross-referencing with a packet listing as described in more detail below.

In one aspect of the present invention, the display described above is augmented with a second display. The displays described above display the packet data graphically in relationship to the timestamps on the packets. To simplify the following discussion, such displays will be referred to as "time displays". The captured packet data that is displayed in a time display can also be displayed in a tabular format with one packet per row in the table. This display will be referred to as the "tabular display" in the following discussion.

The table in the tabular display is organized by the timestamps on the packets. Typically, the rows will be displayed in the order of the timestamp on each row. The number of rows in such a display is much greater than the number that can be readily displayed to a user. Refer now to FIG. 6A, which illustrates a time display having a manually entered marker glyph, M1. Refer now to FIG. 6B, which illustrates the tabular display provided relative to marker M1. To facilitate the use of such a table, a user can select a packet from the time display and execute a command that causes the table display to pop up in a new window with the row corresponding to the selected packet at a predetermined location in the display. The user can then examine the detailed data for that packet and the nearby packets.

In the tabular display mode, the user can also input data that will then be displayed in the time display or merely stored in the table for later viewing in the tabular display mode. For example, the user could add a new glyph to be displayed in the time display, change a glyph that is currently displayed to a new glyph, insert text to be displayed in a text annotation, insert computed quantities for the packet in question, and so on. In one aspect of the present invention, the table in the tabular display is part of a database, and hence, the user can perform any operation on the table that is supported by the database. The changes made to the records in the table will then be reflected in new glyphs or textual annotations in the time display.

The above-described embodiments provide more detailed views of the time data by altering the X-axis zoom level. However, embodiments in which the user can also zoom in or out in the Y-axis direction (separately or simultaneously with the X-axis direction) can also be constructed. The various glyphs used to plot the multi-valued quantities such as transmission rate and the glyphs used to indicate annotations can likewise change display properties with the level of zoom.

Figure 7:
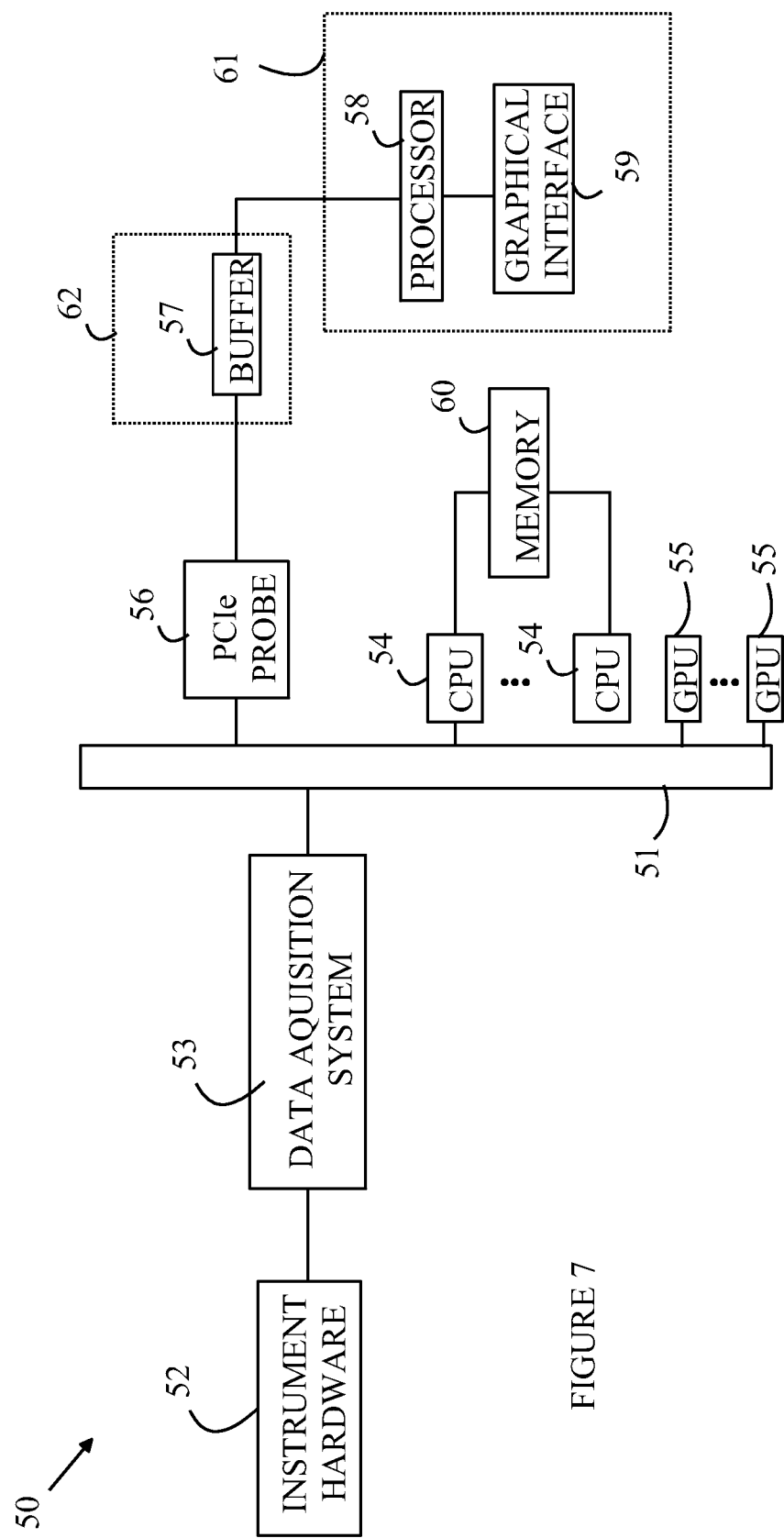
FIG. 7 illustrates a computer implemented instrument that utilizes the method of the present invention to analyze the performance of a PCIe bus within the instrument.

Refer now to FIG. 7, which illustrates a computer implemented instrument that utilizes the method of the present invention to analyze the performance of a PCIe bus within an instrument. In this example, an instrument with an internal PCIe bus is used as an example of a "target system" for probing by a PCIe analyzer. Instrument 50 includes instrument hardware 52 that performs measurements on some physical system connected to it by some appropriate probing method for the measurement being performed. The output of instrument hardware 52 is digitized by a data acquisition system 53, which, in this example, is implemented in a FPGA that is also capable of implementing a PCIe endpoint (with DMA capability in this example). The output of data acquisition system 53 is coupled to a PCIe bus 51 which is used to transfer the data to a memory 60 for processing by one or more processors 54.

It should be noted that a PCIe bus is normally implemented by a link to a processor "root complex" from each attached PCIe endpoint device optionally routed through PCIe "switch" devices in a "tree" topology. This detail is omitted from 51 to simplify the drawing. It should also be noted that a probed PCIe link closer to the "upstream" "root complex" processor 54, may carry PCIe packet traffic from multiple PCIe "downstream" devices such as 53 or 55. The present invention is fully applicable to such a link including the ability to focus on individual data traffic streams relevant to various endpoint combinations if visible to the analyzer probe. One or more graphical processor units 55 or other relevant devices attached to the PCIe bus such as DSPs may be included in instrument 50 to provide display and/or parallel data processing functions needed to process the large volume of high speed data received from data acquisition system 53. It should be noted that the output of data acquisition system 53 can be multiple gigabytes per second which can be a significant fraction of the bandwidth of PCIe bus 51 depending on the specific PCIe implementation and detailed link topology and capacity.

Instrument 50 includes a PCIe bus probe 56 that is inserted in the path of some appropriate internal PCIe link that then becomes a "transparent" element of PCIe bus 51. PCIe bus probe 56 conveys the signals representing a copy of each packet sent on the link. The PCIe bus probe 56 is attached to the PCIe bus analyzer hardware 62 which stores the recorded packets in a buffer 57 that is part of PCIe bus analyzer hardware 62, together with a timestamp indicating the time at which the packet was sent on PCIe bus 51. The recorded data is then processed by a data processor 58 that implements the method of the present invention. The graphical displays of the data generated by the present invention are typically displayed on a graphical user interface 59 which also includes a keyboard and pointing device that are utilized by the user to communicate with the program to adjust the various display features discussed above.

Data processor 58 and graphical user interface 59 may be implemented as part of instrument 50 using the CPUs and GPUs discussed above or be implemented by a separate processor 61 that is not directly connected to instrument 50. In the later case, buffer 57 could include a removable storage medium and/or network link for transferring the recorded packet data to the separate processor for processing in real time. In the former case, the data can be processed after the instrument run that provided the data or in real time if there is sufficient additional computation hardware and bandwidth in instrument 50.

The above-described embodiments of the present invention are directed to the analysis of traffic on a PCIe bus and performance of that bus in actual operation. However, the method of the present invention could be utilized with other forms of data links in which a probe copies and timestamps packets on the data link in which the packets have discernable properties. For example, Ethernet data links could be analyzed using the method of the present invention.

The present invention also includes computer readable storage media that store computer instructions that cause a data processing system to execute the method of the present invention when those instructions are read by the data processing system. Computer readable storage media is defined as any computer readable storage medium that constitutes patentable subject matter under 35 U.S.C. 101. Such storage media include non-transitory storage media such as computer non-volatile computer memories and storage media.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. A method for operating a data processing system to display data related to a plurality of packets that traversed a communication link, said packets comprising packets of different types including data packets, said method comprising:
   providing a copy of said packets and a timestamp for each packet, said timestamp defining a time at which said packet traversed said communication link; and
   generating a display comprising first and second regions, said first region having an X-Y chart in which each packet is represented by a multi-valued glyph denoting a first property related to that packet, said first property having more than two values, said multi-valued glyph being located at an X-axis time value corresponding to said timestamp for that packet and a Y-axis value corresponding to said first property of that packet, and
   said second region comprising a first annotation glyph for one of said packets, said first annotation glyph being located at said X-axis time value corresponding to said timestamp for said one of said packets, said first annotation glyph being present if that packet has a second property and not being present if said packet does not have said second property, said first property being different from said second property, wherein said first property is determined by a packet transmission rate for each packet of a first data packet type.

2. The method of claim 1 wherein said Y-axis value of said first annotation glyph is determined by said second property.

3. The method of claim 1 wherein said second region comprises a second annotation glyph for one of said packets, said second annotation glyph being located at said X-axis time value corresponding to said timestamp for said one of said packets, said second annotation glyph being present if that packet has a third property, said Y-axis value of said second annotation glyph being different from said Y-axis value of said first annotation glyph, said second annotation glyph not being present if that packet does not have said third property.

4. The method of claim 1 wherein said packet transmission rate is determined by an instantaneous rate of transmission for that data packet.

5. The method of claim 4 wherein said packet transmission rate for that packet is computed in relation to an immediately adjacent data packet traversing said communication link in the same direction as that data packet.

6. The method of claim 1 wherein said packet transmission rate is determined for a data packet by determining an average rate of transmission computed over a plurality of data packets including that data packet.

7. The method of claim 1 further comprising displaying a text annotation comprising textual information corresponding to one of said packets at a location determined by said timestamp for that one of said packets.

8. The method of claim 7 wherein said textual information comprises part of said packet.

9. The method of claim 1 further comprising altering a scale of one of said X-axis and said Y-axis in response to input from a user of said data processing system.

10. The method of claim 9 further comprising displaying a text annotation corresponding to one of said packets at a location determined by said timestamp for that one of said packets, said text annotation being characterized by a text annotation property that changes when said X-axis time scale is altered.

11. The method of claim 10 wherein said text annotation is selectively omitted to prevent said text annotations from obscuring one another.

12. The method of claim 11 wherein said text annotations that are omitted depend on said packet type of said packet associated with said text annotation.

13. The method of claim 1 wherein said data packets comprise data packets that are transmitted on a PCIe bus.

14. The method of claim 1 wherein each of said multi-valued glyphs and said first annotation glyph are characterized by display properties, and wherein said display properties are altered in response to a zoom level, to specific packet properties or to a user command.

15. A non-transitory computer readable memory that stores instructions that cause a computer to execute a method for operating a data processing system to display data related to a plurality of packets that traversed a communication link, said packets comprising packets of different types, said method comprising:
   providing a copy of said packets and a timestamp for each packet, said timestamp defining a time at which said packet traversed said communication link; and
   generating a display comprising first and second regions, said first region having an X-Y chart in which each packet is represented by a multi-value glyph denoting a first property related to that packet, said first property having more than two values, said multi-value glyph being located at an X-axis time value corresponding to said timestamp for that packet and a Y-axis value corresponding to said first property of that packet, and said second region comprising a first annotation glyph for one of said packets, said first annotation glyph being located at said X-axis time value corresponding to said timestamp for said one of said packets, said first annotation glyph being present if that packet has a second property and not being present if said packet does not have said second property, wherein said first property is determined by a packet transmission rate for each packet of a first data packet type.

16. The computer readable medium of claim 15 wherein said Y-axis value of said first annotation glyph is determined by said second property.

17. The computer readable medium of claim 15 wherein said second region comprises a second annotation glyph for one of said packets, said second annotation glyph being located at said X-axis time value corresponding to said timestamp for said one of said packets, said second annotation glyph being present if that packet has a third property, said Y-axis value of said second annotation glyph being different from said Y-axis value of said first annotation glyph, said second annotation glyph not being present if that packet does not have said third property.

18. The computer readable medium of claim 15 wherein said method further comprises displaying a text annotation corresponding to one of said packets at a location determined by said timestamp for that one of said packets.

* * * * *